Jan. 10, 1928.
D. L. VAN LEUVEN
RUNNING GEAR
Filed Feb. 18, 1925
1,655,481
3 Sheets-Sheet 1
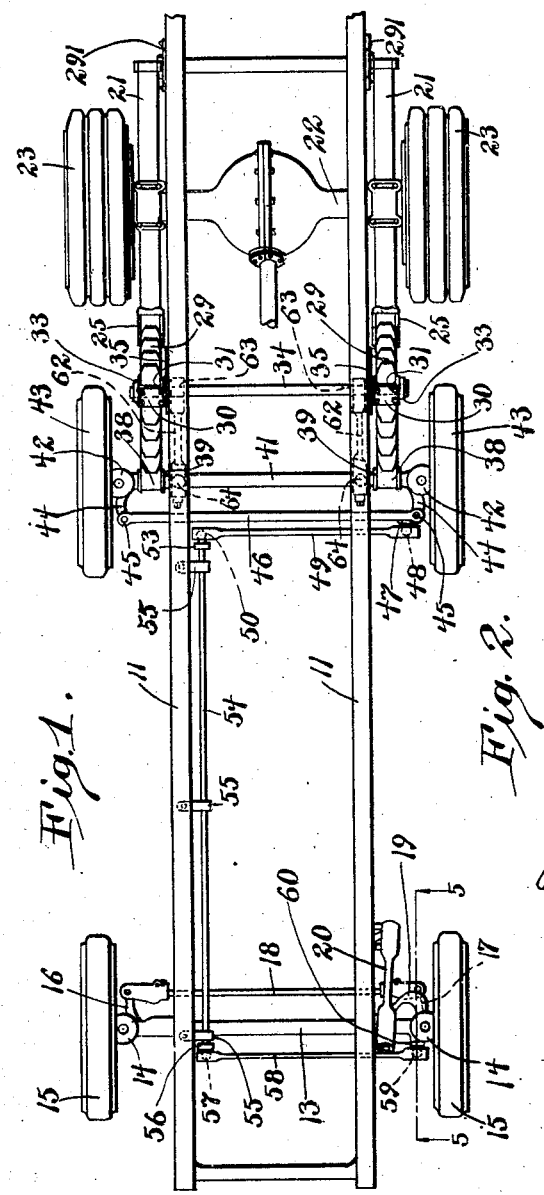
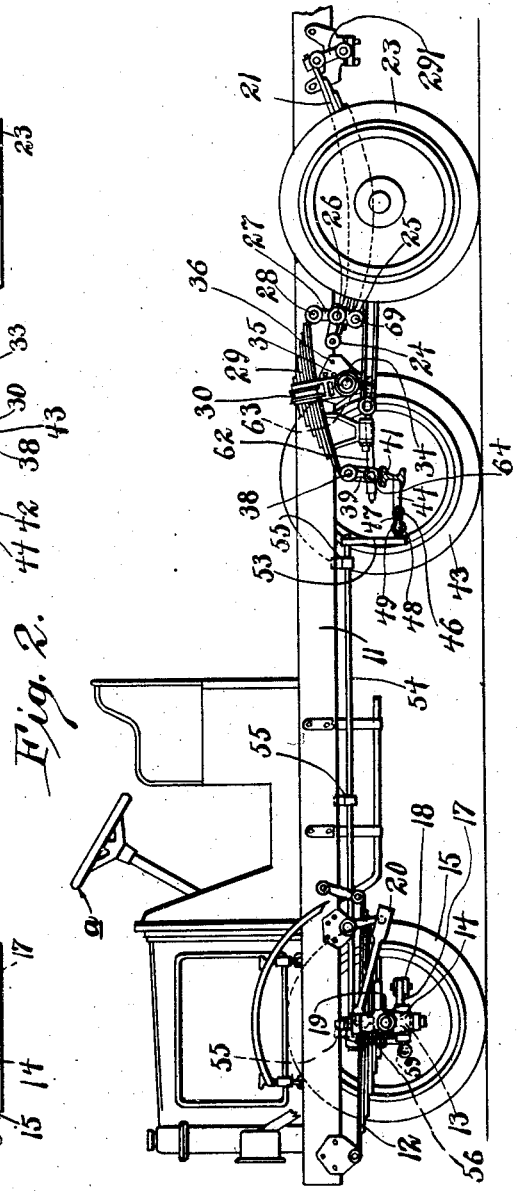
Inventor
David L. Van Leuven,
By Lyon & Lyon
Attorneys Jan. 10, 1928.  1,655,481
D. L. VAN LEUVEN
RUNNING GEAR
Filed Feb. 18, 1925   3 Sheets-Sheet 2
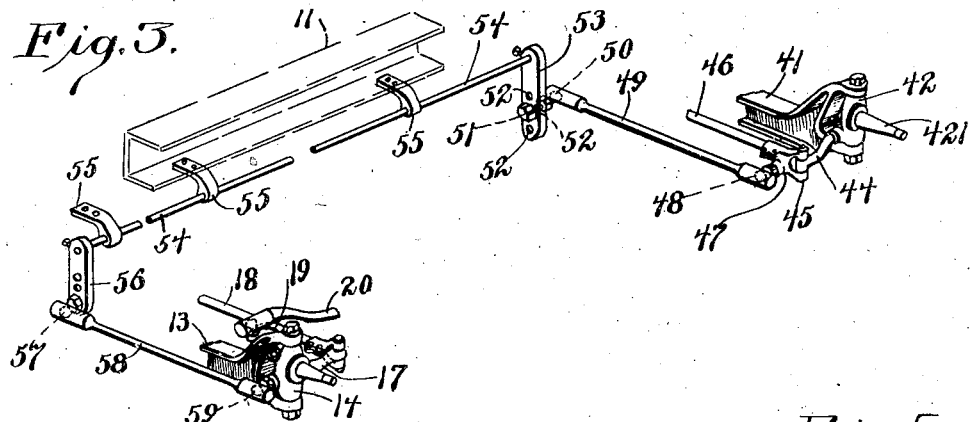
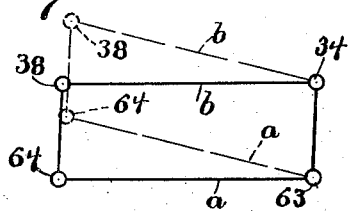
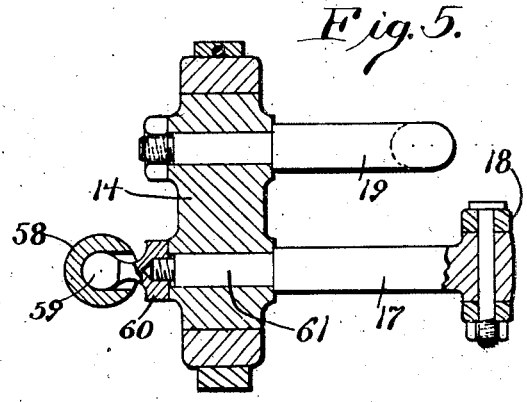
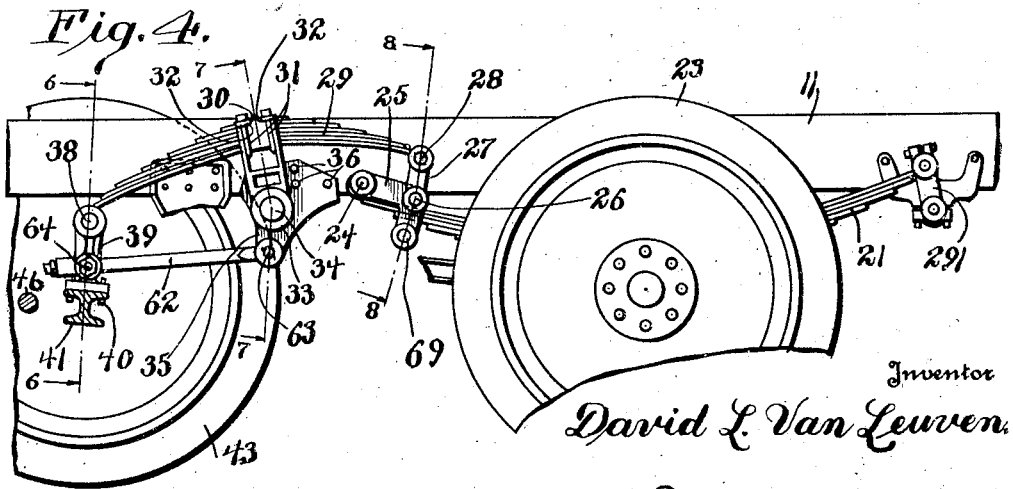
Inventor
David L. Van Leuven.
By Lyon & Lyon
Attorneys Jan. 10, 1928. 1,655,481
D. L. VAN LEUVEN
RUNNING GEAR
Filed Feb. 18, 1925 3 Sheets-Sheet 3
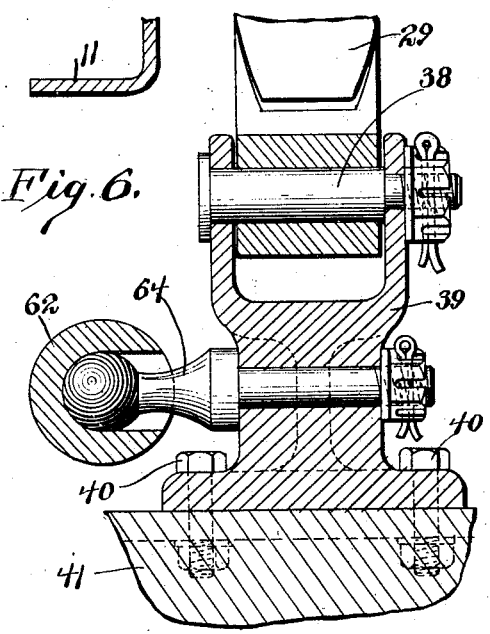
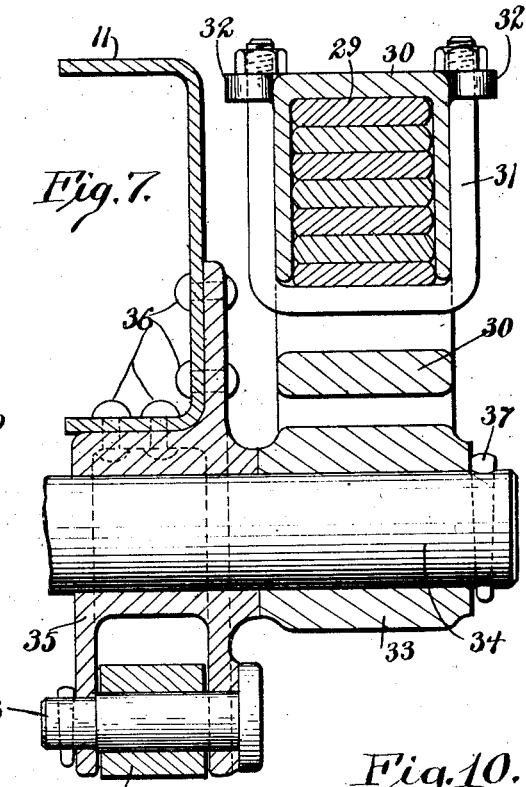
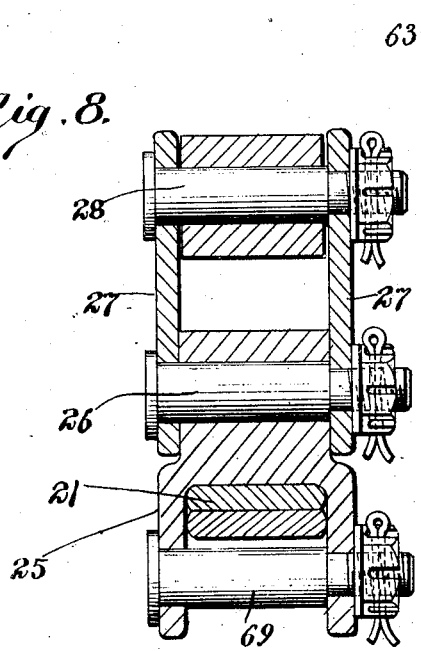
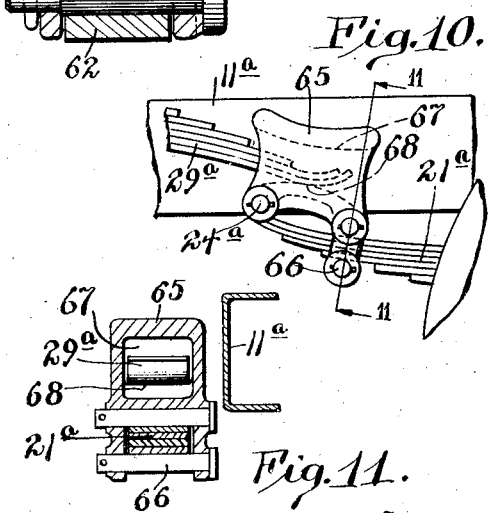
Inventor
David L. Van Leuven.
By Lyon+Lyon
Attorneys Patented Jan. 10, 1928.

1,655,481

UNITED STATES PATENT OFFICE.

DAVID L. VAN LEUVEN, OF EASTMONT, CALIFORNIA.

RUNNING GEAR.

Application filed February 18, 1925. Serial No. 9,939.

This invention relates to the running gears of motor vehicles, and more especially to that type having a plurality of pairs of rear wheels as, for example, the six wheel type of chassis. Such six wheel chassis are employed for carrying loads so heavy that the load limit set by statute for four wheel vehicles would be exceeded.

An important object of the invention is to provide a construction which can be readily used as an attachment to change a four wheel vehicle into a six wheel one.

Another object is to provide a construction that will insure traction for the drive wheels while the auxiliary rear wheels are rising and falling over relatively great irregularities in the roadway.

An object is to effect close coupling of the two pairs of wheels, thus enabling the six wheel type of chassis to employ a frame that needs to be no longer than that used for the four wheel type.

Another object is to facilitate steering of the auxiliary wheels. It is customary to mount the dirigible wheels of motor vehicles so as to tend to "trail", or run along paths that are at right angles to the axle. To effect this the axle is mounted so as to be tilted, thus tilting the steering knuckles, the spindles of which have their axes eccentric to the longitudinal axis of the axle. When a vehicle is provided with three axles, as in the six wheel type, the intermediate axle must rise and fall relative to the frame when the vehicle passes over irregularities of the roadway. Unless provision is made to prevent it, the intermediate axle will turn about its longitudinal axis as it rises and falls relative to the frame, thus often changing the tilt of the steering knuckles to a degree that makes steering very difficult. This invention provides a parallel motion construction to avoid this difficulty.

Another object is to provide a steering gear for the front and auxiliary pairs of wheels that will permit of perfect alignment of one pair with the other pair, even though some of the parts of the steering gear should be bent or the joints become excessively loose through wear.

A further object is to connect the front and rear steering wheels in a manner that the rear steering wheels will tend to align with the front steering wheels and cannot be deflected sufficiently to throw the rear end of the vehicle to one side or the other of the line of travel of the vehicle.

The accompanying drawings illustrate the invention:

Fig. 1 is a plan view of a running gear embodying the invention.

Fig. 2 is a side elevation of Fig. 1.

Fig. 3 is a perspective view of the steering gear with fragments of two of the axles also shown, the steering knuckles of the steering gear being mounted on said axles.

Fig. 4 is an enlarged side elevation of the rear portion of the running gear illustrated in Fig. 1, the view corresponding to the view of the same parts in Fig. 2.

Fig. 5 is an enlarged sectional detail on the line indicated by 5—5, Fig. 1.

Figs. 6, 7 and 8 are enlarged sectional details on the lines indicated by 6—6, 7—7, 8—8, respectively, Fig. 4.

Fig. 9 is a diagrammatic view illustrating the parallel motion construction for maintaining the auxiliary axle against turning about its longitudinal axis as it moves toward and from the frame.

Fig. 10 is a side view of a modified means for slidably connecting the rear and auxiliary springs.

Fig. 11 is a sectional elevation on the line indicated by 11—11, Fig. 10.

The chassis frame of the running gear is indicated at 11 and at its forward end the frame is supported on leaf springs 12 in the usual manner, said leaf springs being carried by a front axle 13. At its opposite ends the axle 13 is provided with steering knuckles 14. Rotatably mounted on the steering knuckles 14 are front steering wheels 15 constituting a pair. These wheels are, therefore, dirigibly connected with the axle.

Steering of the front wheels is effected in the usual manner, the steering knuckles 14 having rearwardly projecting arms 16, 17 respectively, and to said arms are pivoted the opposite ends of a tie or cross rod 18. One of the steering knuckles 14 is provided with a second arm 19 which is connected to an operating member 20 controlled by the driver of the automobile through the usual operating mechanism, indicated in general at a.

To the rear portion of the frame 11 are pivotally connected, in the usual manner, leaf springs 21 that are supported intermediate of their ends on the axle housing 22 in which the drive axle (not shown) is positioned, a pair of rear wheels 23 being driven by said axle. The mounting of the rear springs 21 may be standard with the exception that, instead of one end of each of said springs being connected by shackles in the usual manner with the frame 11, in one construction, Fig. 4, there is pivoted to each of the springs 21 at 24 a furcated shackle arm 25 and pivoted at 26 to each of the arms 25 is a pair of shackle links 27 which are pivoted by shackle bolts 28 to a leaf spring 29, that may be of reverse curvature to the spring 21. The reverse curvature of the springs 29 admits of close coupling of the drive wheels and auxiliary wheels as the springs 21, 29 can be in overlapping relation. The shackle connecting the spring 21 to the frame is indicated at 291.

In Figs. 10, 11 there is shown a means for slidably connecting the springs 21ª, 29ª, corresponding to the springs 21, 29, said means comprising a guide 65 secured by the shackle bolt 24ª and bolt 66 to the spring 21ª. The guide 65 has a longitudinal opening 67, the bottom wall of said opening forming a seat 68 for one end of the spring 29 to slide on and the side walls preventing relative side play between the adjacent ends of the springs 21ª, 29ª.

The construction now to be described is the same for opposite sides of the running gear and, accordingly, only the parts at one side will be described. The spring 29 is fulcrumed by suitable means on the frame 11 and the fulcruming means are constructed, in this instance, as follows:

Secured to the intermediate portion of the springs 29 is a U-shape arm 30 that embraces said spring, U-bolts 31 passing through ears 32 of the arm 30 beneath the spring 29 securing said arm and spring against relative movement. The arm 30 is provided at its lower end with a bearing 33 journaled on a stud 34 which projects from a support 35 riveted or otherwise secured at 36 to the frame 11, a taper pin 37 extending through the stud 34 preventing the arm 30 from slipping off of the stud 30.

As stated above, one end of the spring 29 is pivotally connected with the shackle arm 25, the other end of said spring being pivoted by a shackle bolt 38 between the furcations of a furcated bracket 39 bolted or otherwise secured at 40 to an auxiliary axle 41. The axle 41 is provided at its opposite ends with steering knuckles 42 and rotatably mounted on said steering knuckles are the auxiliary wheels 43 constituting a pair. These wheels are, therefore, dirigibly connected with the axle. In the instance shown in the drawings, the auxiliary axle 41 is positioned intermediately of the front and rear axles or, in front of the rear axle, but it is to be understood that, if desired, the axle 41 may be positioned at the rear end of the frame with the axle housing 22 and wheels 23 in front thereof and that the steering connection may be altered sufficiently to effect turning of the steering knuckles 42 in the opposite direction to turning of the steering knuckles 14, the steering connection shown providing for turning of the steering knuckles 42 in the same direction as the steering knuckles 14.

The steering knuckles 42 have forwardly projecting arms 44 which are pivotally connected at 45 to the opposite ends of a tie or cross rod 46, a connecting member 47 on one end of the rod 46 carrying one of the pivots 45. This member 47 is pivotally connected at one end at 48 to a connecting rod 49 that extends transversely from one side of the frame 11 to the opposite side thereof. The other end of the connecting rod 49 is pivotally connected at 50 to a stud 51 which engages in one of a number of holes 52 in a crank arm 53 which is fixed to a rock shaft 54. By adjusting the stud 51 to different holes 52, the throw of the connecting rod 49 can be increased or diminished. The rock shaft 54 is journaled in bracket bearings 55, riveted or otherwise secured to the frame 11. The rock shaft 54 is provided with another crank arm 56 pivotally connected at 57 to a connecting rod 58 that extends transversely from one side of the frame to the other and the connecting rod 58 is pivotally connected at 59 to a nut 60 that is screwed onto one end of the arm 17, said arm 17 having a reduced portion 61 passing through the associated steering knuckle 14 and the nut 60 being screwed onto said reduced portion. The pivotal connection 57 may be adjustable along the crank arm 56 the same as described for the connecting rod 49.

It is to be noted that the axle 41 is atilt (see Fig. 4), the tilt being forwardly and downwardly when the axes of the wheels 15, 23, 43 are in a plane, that the steering knuckles 42, in consequence, are also atilt forwardly and downwardly, and that the spindles 421 have their axes eccentric to the longitudinal axis of the axle 41. This construction is well known in this art and is for the purpose of causing the wheels on the spindles 421 to trail or run along paths that are at right angles to the axle.

However, if provision were not made to prevent it, the axle 41 would turn about its longitudinal axis as said axle rises and falls relative to the frame when the wheels engage portions of the roadway lying in different horizontal planes. To avoid this a parallel motion construction is employed, that portion of each of the springs 29 extending from the brackets 30 to the shackle bolts 38 together with each of the brackets 30 constituting one member of said construction, each of the brackets 39 constituting a second member, that portion of each of the supports 35 extending from the stud 34 to a radius rod 62 constituting a third member, and the rod 62 constituting the fourth member. The rods 62 are pivoted at one end at 63 to the supports 35 and at their other ends at 64 to the brackets 39. The distance between the pivots 38, 64 is the same as that between the stud 34 and pivot 63, thus making, in Fig. 9, the line *a* connecting the pivots 63, 64, parallel with the line *b* connecting the pivots 34, 38. When the axle 41 moves toward the frame it causes the pivots 38, 64 to swing in arcs about the pivots 34, 63, respectively, as shown by the broken lines indicating the change in position of the lines *a*, *b*, thus maintaining the tilt of the axle 41 and steering knuckles 42 regardless of the position of the axle 41 relative to the frame 11.

In the operation of steering the vehicle, the operating member 20 will be moved to steer the front wheels, in a manner well understood in this art, and the motion will be transmitted through the connecting rod 58 and crank arm 56 to the rock shaft 54 which, in turn, will operate the connecting rod 49 through the crank arm 53 so as to swing the arm 44 and cause steering of the auxiliary wheels. The steering knuckles 42 will not turn through as great an angle as the steering knuckles 14, because the distance between the pivot 48 and axis of the steering knuckle 42 is greater than the distance between the pivot 59 and axis of the steering knuckle 14, but the steering radius of the auxiliary wheels in relation to that of the front wheels may be readily altered by changing the position of the stud 51 to a different hole 52.

An advantage of having the rock shaft 54 on one side of the frame and the connecting rods 49, 58 extending transversely from the rock shaft to the steering knuckles that they control, is that the connecting rods 49, 58 can swing in an arc in a horizontal plane about the pivots 50, 57 without turning the rock shaft 54. In other words, looseness, resulting from wear at the joints of the steering mechanism, will not throw the front wheels and auxiliary wheels out of alignment as is the case where the connections between the steering knuckles is more direct and extend on that side of the frame where the steering knuckles, with which said connections cooperate, are positioned. The auxiliary wheels, also owing to this construction of the steering gear, cannot be deflected by the sides of a rut so as to climb out of such rut and throw the rear end of the vehicle to one side or the other of the line of travel of the vehicle.

It will be seen that, by having the springs 29 reversed relative to the springs 21, said springs may overlap, thus reducing the length of the wheel base between the wheels 23, 43. This is quite an advantage, especially when the auxiliary wheels are to be installed on a chassis of the four wheel type. If the up and down motion of the auxiliary wheels 43 is excessive, owing to extreme irregularities in the road surface, such motion will be taken care of by turning of the springs 29 about the fulcrum point of said springs, namely, the studs 34.

To limit pivotal movement of each of the arms 25 it is preferable to make the arm L-shape, to have the spring 21 embraced by the furcations of said arm, and to have a bolt 69 in said arm extend across the arm beneath the spring 21. The arms 25 are mainly for the purpose of enabling the springs 21, 29 to be connected in overlapping relation which permits the use of longer springs or closer coupling of the rear and auxiliary axles than if said springs were not thus overlapped.

I claim:

1. A running gear for vehicles, comprising axles, a pair of wheels rotatably connected with one of the axles, a pair of wheels rotatably and dirigibly connected with another of the axles, the axis of rotation of the last wheels being eccentric to the longitudinal axis of the associated axle and said associated axle being atilt about its longitudinal axis in a direction to position the axes of rotation rearwardly of the said axis of the axle, a chassis frame, leaf springs supported intermediate of their ends on the first mentioned axle and connected at one end to the frame, leaf springs supported at one end on the second mentioned axle, means fulcruming the second mentioned springs intermediate of their ends on the frame, means movably connecting the other end of the first mentioned springs to the other end of the second mentioned springs, and means operating in conjunction with the second mentioned springs to prevent turning of the axle associated therewith about its longitudinal axis when said axle moves in an arc about the fulcrum of the second mentioned springs without vibrating said second mentioned springs.

2. A running gear for vehicles comprising axles, a pair of wheels rotatably connected with each of the axles, a chassis frame, leaf springs supported intermediate of their ends on one of the axles and pivotally connected at one end to the frame, other leaf springs pivotally connected at one end to another of the axles, means fulcruming the intermediate portion of the second mentioned springs on the frame, means movably connecting the other end of the first mentioned springs to the other end of the second mentioned springs, and radius rods connected to the fulcruming means and to the second mentioned axles.

3. A running gear for vehicles comprising axles, a pair of wheels rotatably connected with each of the axles, a chassis frame, leaf springs supported intermediate of their ends on one of the axles and pivotally connected at one end to the frame, brackets secured to the other axle, other leaf springs pivotally connected at one end to the brackets, other brackets pivoted on the frame and secured to the intermediate portions of the second mentioned springs, means normally connecting the other end of the first mentioned springs to the other end of the second mentioned springs, and radius rods pivotally connected at one end to the first mentioned brackets and at their other end to the second mentioned brackets.

4. A running gear for vehicles comprising axles, a pair of wheels rotatably connected with each axle, the wheels of one pair being dirigible and mounted to trail in the normal running thereof with the forward pair of wheels, and means comprising links and a spring composing a parallelogram yieldingly connecting the frame to the axle of said dirigible wheels and operating to hold the axle having the dirigible wheels in position as said axle moves up and down relative to the frame.

5. In a truck chassis, the combination of a frame, a pair of steering wheels, a pair of drive wheels, a third pair of wheels, axles secured to the frame in spaced relation for supporting the wheels, a pair of springs secured to the frame at one end, means for securing the driving wheel axle at an intermediate point of the springs, the springs being curved upwardly from the axle, a pair of third wheel axle springs, the latter springs being secured at their ends to the third wheel axle at opposite sides of the frame and being curved downwardly, means for connecting the adjacent ends of the springs together on the opposite sides of the frame, and means for securing the third wheel axle springs to the frame.

6. In a truck chassis, the combination of a frame, a pair of steering wheels, a pair of drive wheels, a third pair of wheels, axles secured to the frame in spaced relation for supporting the wheels, a pair of springs secured to the frame at one end, means for securing the driving wheel axle to an intermediate portion of the springs, the springs being curved upwardly from the axle, a pair of third wheel axle springs, means for fulcruming the latter springs from the frame, the latter springs being curved downwardly from the fulcruming means, means for connecting the adjacent ends of the springs on the opposite sides of the frame, and means for securing the free ends of the third wheel axle springs to the third wheel axle.

7. In a truck chassis, the combination of a frame, a pair of steering wheels, a pair of drive wheels, a third pair of wheels, axles secured to the frame in spaced relation for supporting the wheels, a pair of springs secured to the frame at one end, means for securing the driving wheel axle to an intermediate portion of the springs, the springs being curved upwardly from the axle, a pair of third wheel axle springs, means for fulcruming the latter springs from the frame, the latter springs being curved downwardly from the fulcruming means, means for connecting the adjacent ends of the springs on the opposite sides of the frames, means for securing the free ends of the third wheel axle springs to the third wheel axle, and radius rods pivotally connected at one end to the fulcruming means and pivotally connected at their opposite ends to the third wheel axle.

8. In a truck chassis, the combination of a frame, a pair of steering wheels, a pair of rear wheels, a third pair of wheels, axles for supporting the wheels and secured to the frame in spaced relation, a pair of springs fulcrumed to the driving wheel axle, means for securing one end of the springs to the frame, the springs being curved upwardly from the axle, brackets secured to the frame, means supported by the brackets for fulcruming a second pair of springs, the latter said springs being curved downwardly from the fulcruming means, links pivotally connecting the adjacent ends of the springs on the opposite sides of the frame, and the opposite end of the latter said springs being connected with the third wheel axle.

9. In a truck chassis, the combination of a frame, a pair of steering wheels, a pair of rear wheels, a third pair of wheels, axles for supporting the wheels and secured to the frame in spaced relation, a pair of springs fulcrumed to the driving wheel axle, means for securing one end of the springs to the frame, the springs being curved upwardly from the axle, brackets secured to the frame, means supported by the brackets for fulcruming a second pair of springs, the latter said springs being curved downwardly from the fulcruming means, links pivotally connecting the adjacent ends of the springs on the opposite sides of the frame, the opposite end of the latter said springs being connected with the third wheel axle, and radius rods secured at one end to the third wheel axle and secured at their opposite end to the frame.

10. A vehicle having a front axle, a pair of rear axles, ground wheels rotatable upon said axles, means for driving the ground wheels on one of the rear axles, springs secured intermedate their ends to the driven rear axle, means for pivotally securing one end of each of said springs to the frame of the vehicle, spindles secured to the frame, levers rotatable upon said spindles, and means for pivotally connecting said levers to the other end of each of said springs and to the other rear axle, said levers being mounted for independent equalization on opposite sides of the vehicle.

11. A vehicle having a front axle, a pair of rear axles, ground wheels rotatable upon said axles, means for driving the ground wheels on one of the rear axles, springs secured intermediate their ends to the driven rear axle, means for pivotally securing one end of each of said springs to the frame of the vehicle, springs pivotally secured intermediate their ends to the frame on each side of the frame, means for pivotally connecting the adjacent ends of the springs on each side of the frame, means for connecting the opposite ends of the second said springs to the other of said axles, the springs being mounted for independent equalization on opposite sides of the frame.

12. A vehicle having a front axle, a pair of rear axles, ground wheels rotatable upon said axles, means for driving the ground wheels on one of said axles, springs secured intermediate their ends to the driven rear axle, means for connecting one end of each of said springs to the frame of the vehicle, spindles secured to the frame, levers rotatable upon said spindles, means for connecting said levers to the other end of each spring to permit relative movement of the ends of said springs and levers, and means for connecting said levers to the other rear axle, said levers being mounted for independent equalization on opposite sides of the frame.

Signed at Los Angeles, California, this 12th day of February, 1925.

DAVID L. VAN LEUVEN.